Patented Nov. 29, 1938

2,138,553

UNITED STATES PATENT OFFICE 2,138,553

DYEINGS ON CELLULOSE ESTERS

Friedrich Wilhelm Muth, Leverkusen I. G.-Werk, Germany, assignor to General Aniline Works, Inc., New York, N. Y., a corporation of Delaware No Drawing. Application July 7, 1936, Serial No. 89,470. In Germany July 17, 1935

11 Claims. (Cl. 8—50)

The present invention relates to a process for the manufacture of azo dyestuffs on cellulose esters, especially cellulose acetate silk, and to the dyed cellulose esters obtained thereby, more particularly it relates to a process for the manufacture on cellulose esters, especially cellulose acetate silk, of dyestuffs, which may be represented by the general formula:

In the said formula X stands for a member selected from the group consisting of O, S, SO, $SO_2$, S—S, $CH_2$, CO, CH=CH, R stands for the radical of a diazotization component, which, it being self-understood, may bear an azo group, $n$ stands for one of the numbers 1 and 2, wherein the hydroxy group stands in ortho-position to the azo group, and wherein the benzene nuclei may bear carboxylic acid groups as substituents.

The new dyeings on the cellulose esters, especially cellulose acetate silk, are obtained by applying to the cellulose acetate silk, an aromatic base or amino azo compound, diazotizing and coupling in a neutral, weakly alkaline or acid bath with a coupling component of the general formula:

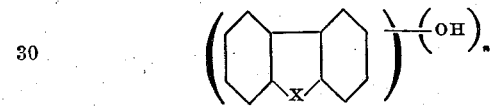

wherein X and $n$ means the same as stated above and wherein the benzene nuclei may bear carboxylic acid groups as substituents.

The method of producing developing azo dyestuffs on cellulose esters, especially cellulose acetate silk, has been described, e. g. in German Patents 446,220 and 549,641. By the new process there are obtained, depending on the specific components used, various shades, especially dark brown to blackish brown shades, which in every respect are of good fastness properties and which are distinguished by an improved dischargeability, and in part by an improved fastness to light.

As coupling components, suitable for the process of the present invention, there may be mentioned by way of example 1-, 2-, or 3-hydroxydiphenyleneoxide, 3,6-dihydroxydiphenyleneoxide, 3-hydroxydiphenyleneoxide-2-carboxylic acid, 3-hydroxydiphenylene-sulfide - 2 - carboxylic acid, 3,6-dihydroxydiphenyleneoxide - 2,7 - dicarboxylic acid, 3,6-dihydroxydiphenylenesulfide-2,7-dicarboxylic acid, 2 - hydroxyphenanthrene - 3 - carboxylic acid, 3 - hydroxyphenanthrene - 2 - carboxylic acid, 1-, 2-, 3-, or 4-hydroxyphenanthrene, dihydroxyphenanthrene, 2-hydroxyfluorene, 4-hydroxyfluorene, 2-hydroxyfluorene-3-carboxylic acid, 2-hydroxyfluorenone, 3-hydroxyfluoreone-2-carboxylic acid and similarly constituted acids.

Example 1

1% of dianisidine is applied to acetate artificial silk in the usual manner, diazotized on the fiber and developed for half an hour with 2% of 2-hydroxyphenanthrene dissolved with caustic soda lye, first at ordinary temperature and then at a temperature which is gradually raised to 60° C. Then the dyeing is soaped in the usual manner. A deep reddish brown of good fastness properties is obtained.

The dyestuff corresponds to the following formula:

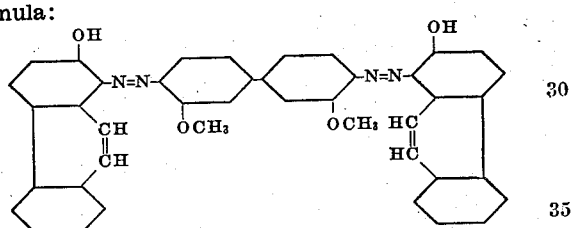

Example 2

0.8% of the dyestuff p-aminobenzene-azo-α-naphthylamine is dyed in the usual manner on acetate artificial silk, diazotized on the fiber and developed for half an hour with 3% of 3-hydroxyphenanthrene dissolved with caustic soda lye, as described in Example 1, and then the dyeing is soaped. A dark brown dyeing of good fastness properties is obtained.

The dyestuff corresponds to the following formula:

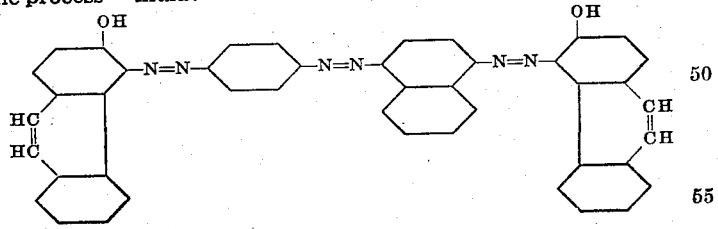

Example 3

3% of α-naphthylamine is applied in the usual manner to acetate artificial silk, diazotized on the fiber and developed at ordinary temperature with 3% of 3-hydroxydiphenylene-oxide-2-carboxylic acid. A brown dyeing of good fastness properties is obtained.

The dyestuff corresponds to the following formula:

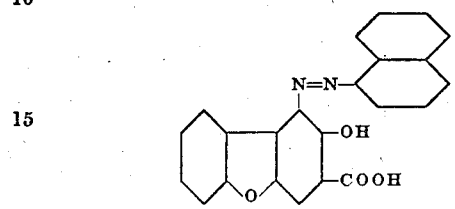

In an analogous manner are obtained:

I claim:

1. A process which comprises applying to a cellulose ester a diazotization component suitable for the manufacture of azo dyestuffs, diazotizing and coupling with a compound of the group consisting of diphenylene compounds of the general formula:

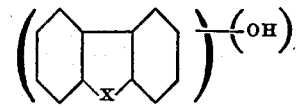

wherein X stands for a member selected from the group consisting of O, S, SO, $SO_2$, S—S, $CH_2$, CO, CH=CH and $n$ stands for one of the numbers 1 and 2, and such derivatives thereof, bearing in the benzene nuclei a carboxylic acid group.

2. A process which comprises applying to a cellulose ester a diazotization component suitable

| By combination of— | With— | |
|---|---|---|
| p-Aminobenzene-azo-α-naphthylamine | 3-hydroxydiphenylene-oxide-2-carboxylic acid | A brown. |
| Do | 3-hydroxydiphenylene-sulfide-2-carboxylic acid | A yellowish brown. |
| Do | 3-hydroxyphenanthrene-2-carboxylic acid | A brown. |
| Do | 2-hydroxydiphenylene-oxide | A yellowish brown. |
| Do | 3-hydroxydiphenylene-oxide | A reddish brown. |
| Do | 2-hydroxyphenanthrene | A deep reddish brown. |
| Do | 2-hydroxyfluorene | A yellowish brown. |
| Do | 3,6-dihydroxyphenanthrene | A reddish dark brown. |
| Do | 3-hydroxydiphenylene sulfone | A brown. |
| 3,3'-dimethoxy-4,4'-diaminodiphenyl | do | A rust brown. |
| Do | 3-hydroxyphenanthrene | A blackish brown. |
| Do | 3-hydroxydiphenylene-oxide | A reddish brown. |
| Aminoazo-benzene | do | Orange. |
| Do | 3-hydroxydiphenylene-oxide-2-carboxylic acid | Olive-brown. |
| Amino azo-toluene | do | Khaki. |
| m-Amido benzoic acid + o-anisidine | do | Acid coupling: greyish brown. Neutral coupling: reddish brown. |
| 2-chloro-4-nitraniline-dimethylaniline (reduced) | do | A reddish brown. |
| 3,3'-dimethoxy-4,4'-diaminodiphenyl | do | A violetish blackish brown. |
| Do | 3,6-dihydroxyphenanthrene | A dark brown. |
| p-Amido benzene-α-naphthylamine | do | Do. |
| 3,3'-dimethoxy-4,4'-diaminodiphenyl | 3-hydroxydiphenylene-sulfide-2-carboxylic acid | A violetish dark brown. |
| Do | 3-hydroxyphenanthrene-2-carboxylic acid | Do |
| Do | 2-hydroxyfluorene | A reddish brown. |
| Do | 2-hydroxydiphenylene-oxide | Do. |
| Amino azo-benzene | 3,6-dihydroxydiphenyleneoxide | Neutral coupling: A rust orange. Acid coupling: A dull reddish orange. |
| Amido azo-toluene | do | Neutral coupling: A brownish orange. Acid coupling: A clear reddish brown. |
| m-Amido benzoic acid + o-anisidine | do | Neutral coupling: A violetish brown. Acid coupling: A dull garnet. |
| 2-chloro-4-nitraniline-dimethylaniline (reduced) | do | Neutral coupling: A violetish brown. Acid coupling: A dull garnet. |
| p-Amido benzene-α-naphthylamine | do | Neutral coupling: A reddish brown. Acid coupling: A violetish brown. |
| α-Naphthylamine | do | Neutral coupling: A reddish brown. Acid coupling: A violetish brown. |
| 3,3'-dimethoxy-4,4'-diaminodiphenyl | do | Neutral coupling: A reddish brown. Acid coupling: A violetish brown. |
| Aminodiazobenzene | 3,6-dihydroxydiphenylene-sulfide | Neutral coupling: A reddish brown. Acid coupling: A reddish brown. |
| 2-chloro-4-nitraniline-dimethylaniline (reduced) | do | Neutral coupling: A violetish brown. Acid coupling: A corinth brown. |
| p-Amido benzene-α-naphthylamine | do | Neutral coupling: A yellowish brown. Acid coupling: A brown. |
| 3,3'-dimethoxy-4,4'-diaminodiphenyl | do | Neutral coupling: A violetish brown. Acid coupling: A blackish brown. | for the manufacture of azo dyestuffs, diazotizing and coupling with a diphenylene compound of the general formula:

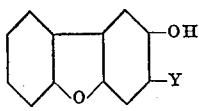

wherein Y means a member selected from the group consisting of hydrogen and the carboxylic acid group.

3. The process which comprises applying to a cellulose ester 3.3'-dimethoxy-4.4'-diaminodiphenyl, diazotizing and coupling with 3-hydroxydiphenylene oxide.

4. A process which comprises applying to cellulose acetate silk a diazotization component suitable for the manufacture of azo dyestuffs, diazotizing and coupling with a compound of the group consisting of diphenylene compounds of the general formula:

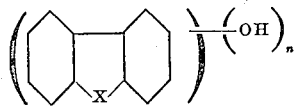

wherein X stands for a member selected from the group consisting of O, S, SO, $SO_2$, S—S, $CH_2$, CO, CH=CH and $n$ stands for one of the numbers 1 and 2, and such derivatives thereof, bearing in the benzene nuclei a carboxylic acid group.

5. Cellulose esters dyed with dyestuffs of the general formula:

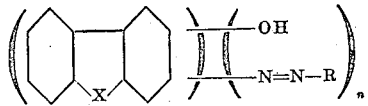

wherein X stands for a member selected from the group consisting of O, S, SO, $SO_2$, S—S, $CH_2$, CO, CH=CH, R stands for the radical of a diazotization compound and $n$ stands for one of the numbers 1 and 2, and wherein the hydroxy group stands in o-position to the azo group and such derivatives thereof bearing in the benzene nuclei a carboxylic acid group.

6. Cellulose esters dyed with the dyestuff of the following formula:

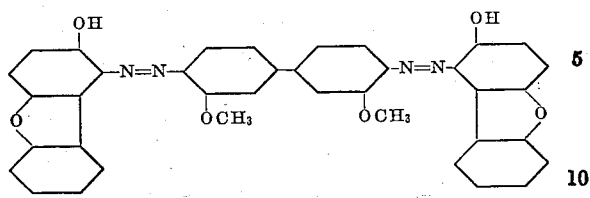

7. Cellulose acetate silk dyed with dyestuffs of the general formula:

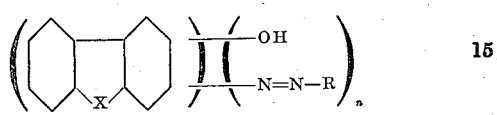

wherein X stands for a member selected from the group consisting of O, S, SO, $SO_2$, S—S, $CH_2$, CO, CH=CH, R stands for the radical of a diazotization compound and $n$ stands for one of the numbers 1 and 2, and wherein the hydroxy group stands in o-position to the azo group and such derivatives thereof bearing in the benzene nuclei a carboxylic acid group.

8. A process which comprises applying to a cellulose ester a diazotization component suitable for the manufacture of azo dyestuffs, diazotizing and coupling with a 3,6-di-hydroxy-diphenylene oxide.

9. A process which comprises applying to a cellulose ester a diazotization component suitable for the manufacture of azo dyestuffs, diazotizing and coupling with a 3,6-di-hydroxy-diphenylene sulfide.

10. A process which comprises applying aminoazo-benzene to a cellulose ester, diazotizing and coupling with a 3,6-di-hydroxy-di-phenylene oxide.

11. A process which comprises applying aminoazo-benzene to a cellulose ester, diazotizing and coupling with a 3,6-di-hydroxy-di-phenylene sulfide.

FRIEDRICH WILHELM MUTH.